Aug. 27, 1935.  G. A. MITCHELL  2,012,514
SWINGING FINDER MOUNTING
Filed Oct. 16, 1933  2 Sheets-Sheet 1
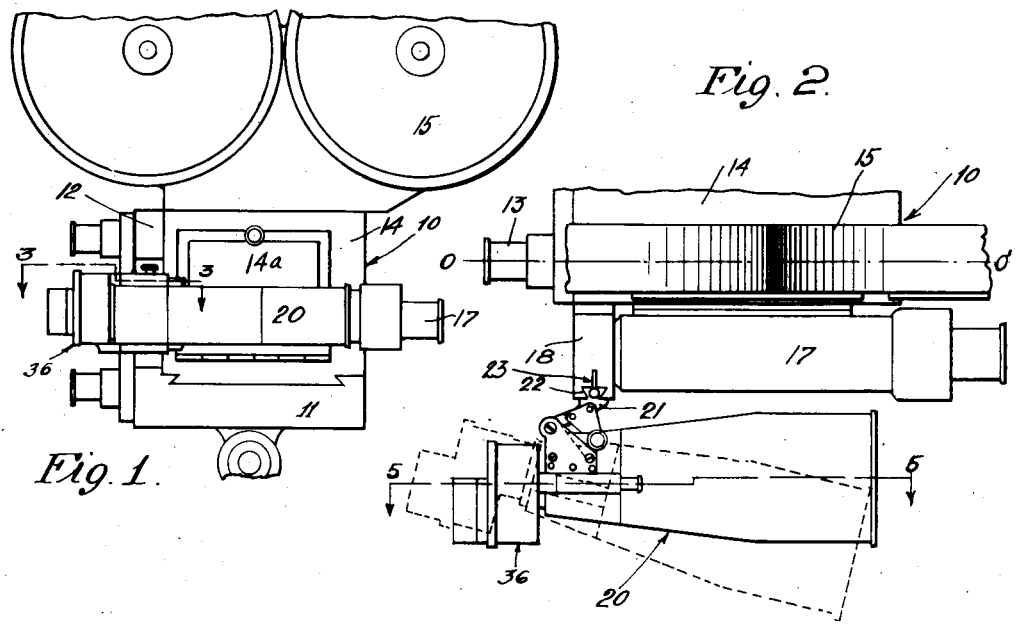
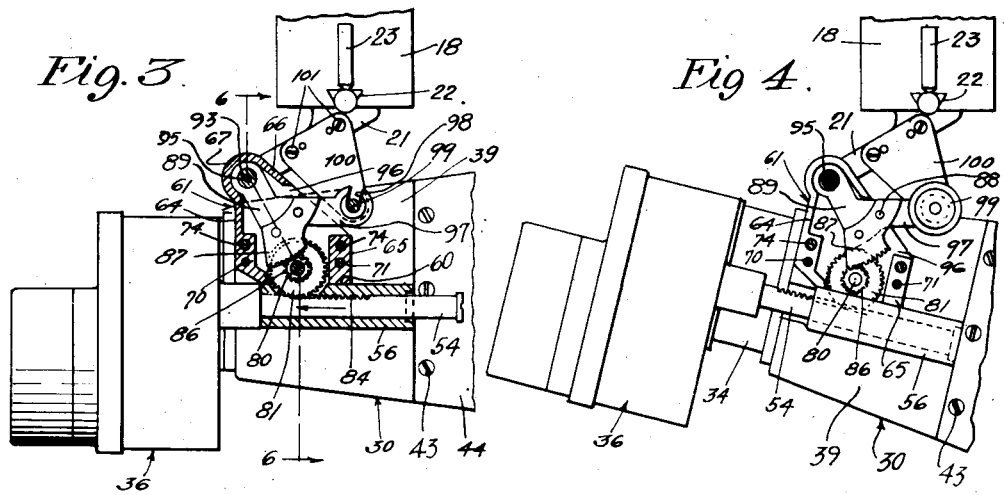
Inventor
George A. Mitchell.
Attorney.

Aug. 27, 1935.  G. A. MITCHELL  2,012,514
SWINGING FINDER MOUNTING
Filed Oct. 16, 1933   2 Sheets-Sheet 2
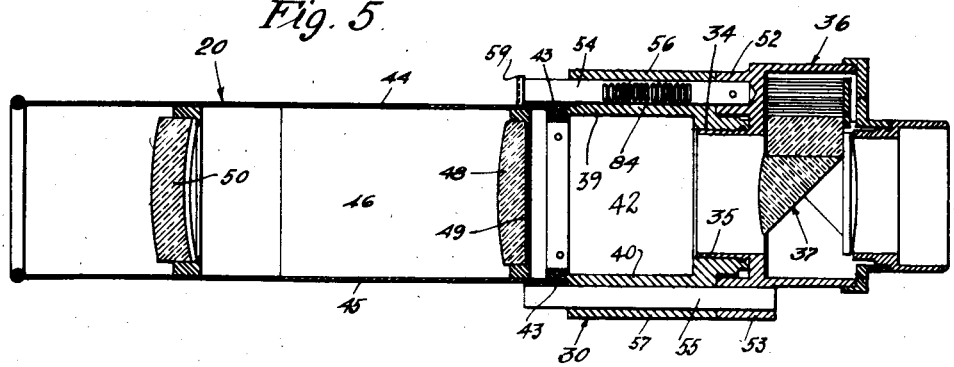
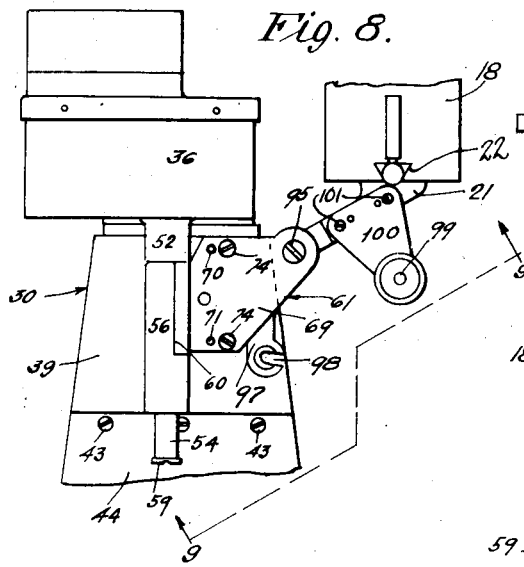
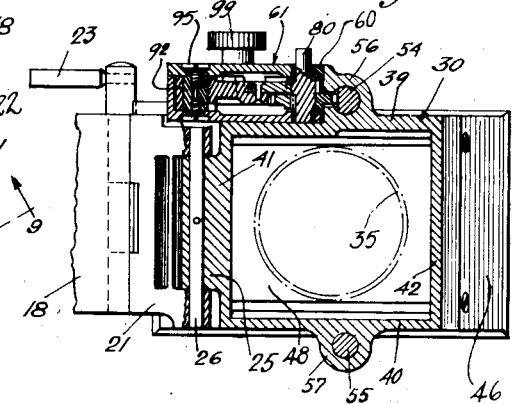
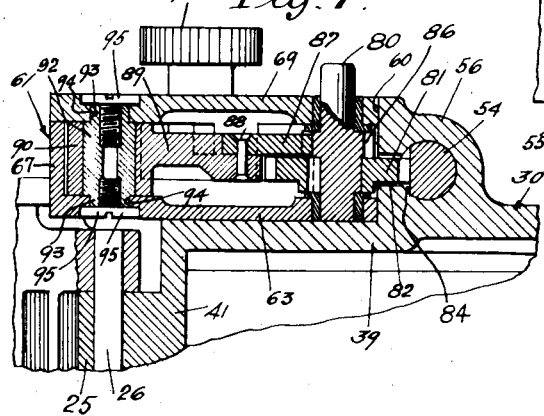
Inventor.
George A. Mitchell.
Attorney.

Patented Aug. 27, 1935

2,012,514

UNITED STATES PATENT OFFICE 2,012,514

SWINGING FINDER MOUNTING

George A. Mitchell, Beverly Hills, Calif., assignor to Mitchell Camera Corporation, West Hollywood, Calif., a corporation of Delaware Application October 16, 1933, Serial No. 693,738

8 Claims. (Cl. 88—1.5)

This invention relates generally to view finding instruments as used on motion picture cameras, and more particularly to focusing means for such view finding instruments.

The view finder of a motion picture camera is ordinarily arranged to one side of the camera, and has a vertical mounting enabling it to be swung in a horizontal plane for parallax adjustment, or in other words to bring its field of view into coincidence with that on which the camera lens is focused. The finder is equipped with a focusing objective, and it is necessary, each time the camera lens is focused on an object at a different distance from the camera, to swing the finder to correct for parallax and also to readjust the focus of the finder objective.

It is an object of the present invention to provide means operative to focus the finder objective by virtue of the swinging movement of the finder body in making the parallax adjustment.

It is a mathematically demonstrable fact that the distance the finder lens must be moved to preserve accurate focus, as the finder is swung to view objects in the field of view of the camera lens at different distances from the camera, must be proportional to the tangent of the angle through which the finder body is swung. It is a feature of the mechanism of the present invention that the finder objective is automatically moved substantially proportionally to the tangent of the angle of swing of the finder body as the finder is swung on its pivotal mounting to correct for parallax.

The invention will be best understood from the following detailed description of the present preferred embodiment thereof, reference for this purpose being had to the accompanying drawings, in which:

Fig. 1 is a side elevation showing a conventional motion picture camera equipped with a view finder;

Fig. 2 is a plan view looking down on the view finder shown in Fig. 1 and also showing a portion of the camera;

Fig. 3 is a detailed view taken as indicated by broken lines 3—3 of Fig. 1 and showing the finder lens focusing mechanism;

Fig. 4 is a view somewhat similar to Fig. 3, but showing the parts in elevation rather than in section, with the gear housing cover plate removed, and also showing the finder swung to an angle different from that shown in Fig. 3;

Fig. 5 is a vertical longitudinal section of the finder taken as indicated by line 5—5 of Fig. 2;

Fig. 6 is a section taken as indicated by broken line 6—6 of Fig. 3;

Fig. 7 is an enlarged detail taken from Fig. 6;

Fig. 8 is a plan detail of a portion of the finder and mounting showing the finder swung out to inoperative position; and Fig. 9 is a view taken in the direction of line 9—9 of Fig. 8.

In the drawings there is shown at 10 a conventional motion picture camera comprising base 11, head 12 rising from the front end of said base and carrying photographic objective 13, camera box 14 supported on base 11 to the rear of head 12, and film magazine 15 mounted on box 14. Within box 14 is the usual exposure aperture plate and intermittent mechanism for moving the film past said plate, these parts not being illustrated since they may be of any conventional design. Focusing tube 17 is mounted on the side of the camera box and extends along one side thereof to terminate back of a bracket 18 extending laterally from camera head 12. Said bracket 18 supports the view finder instrument, designated generally by numeral 20. The use of the focusing tube in the type of camera illustrated is well understood and will require no explanation here.

As indicated in the drawings, a view finder carrying bracket 21 is fitted into stationary bracket 18 by means of a vertical dove-tail way 22. A clamping device, indicated at 23, is provided to lock bracket 21 rigidly to bracket 18. Bracket 21 extends outwardly and forwardly from bracket 18, as at the angle shown in the plan views of the device, and is shaped at its forward end to provide a yoke which receives a view finder mounting boss 25, a pivot pin 26 extending downwardly through the yoke arms and boss 25 (see Fig. 6). The view finder swings for its parallax adjustment movement on this pivot pin 26. Boss 25 is formed on one side and at the forward end of a head casting 30 of the finder.

The forward end of said casting 30 has a bore 34 which slidably receives and serves as a bearing for the tubular rearward extension 35 of the forwardly and rearwardly movable view finder objective mounting 36. The objective combination, designated at 37, is preferably an erecting combination giving an image which is right side up and correct as for right and left, such a combination being described in my Reissue Patent No. 17,995, entitled "Erecting finder."

Casting 30 is substantially rectangular in transverse cross section, comprising top wall 39, bottom wall 40, and side walls 41 and 42 which diverge rearwardly, as shown. Secured to the rear end of casting 30, as by screws 43, are upper and lower view finder casing walls 44 and 45, respectively, and side walls 46, which latter diverge rearwardly for a distance in continuation of the side walls of casting 30, and are then parallel to each other, as clearly shown in the drawings. The finder casing walls form with casting 30 a light conduit from objective combination 37 to the rear open end of the instrument. The casing carries suitable optical elements, as a collector lens 48 having a ground glass surface 49 at the proper distance back of objective 37, and a second collector lens 50 back of lens 48.

Objective mounting 36 has, above and below tubular extension 34, rearwardly extending bosses 52 and 53, respectively, into which are rigidly set parallel rearwardly extending guide rods 54 and 55, respectively. These guide rods extend through slide bearings 56 and 57 formed on the top and bottom walls 39 and 40 of casting 30. Rearward movement of lens mounting 36 with reference to finder head 30 is limited by engagement of bosses 52 and 53 with the forward ends of bearings 56 and 57, while forward movement of mounting 36 is limited by engagement of a head 59 on the rear end of upper rod 54 with the rear end of bearing 56.

Slide bearing 56 is formed, on its side next the camera, with a vertical face 60, and mounted on finder top wall 39 in engagement with said face 60 is a housing 61 for certain automatic focusing gearing to be described. This housing 61 is made up of bottom 63 resting on wall 39, front wall 64 flush with the front end of finder head casting 30, a rear wall 65 and angular side wall 66 which merges with arcuate wall 67 joining it to wall 64. The housing is closed by a removable top plate 69, and is secured to wall 39 by means of vertical pins 70 and 71 which extend downwardly through said plate 69 and housing walls 64 and 65, respectively, and are set tightly into finder casting wall 39. Top plate 69 is secured in place by means of screws 74, which also pass through the front and rear housing walls 64 and 65 and then screwthreaded into finder wall 39.

Mounted in suitable bearings in lower housing wall 63 and housing top plate 69 is a vertical gear shaft 80. This shaft is located adjacent the aforementioned vertical face 60 of slide bearing 56, and has keyed thereon a gear 81 which extends through an aperture 82 in bearing member 56 to engage rack teeth 84 cut on the adjacent surface of rod 54. It will be evident that rotation of shaft 80 will cause gear 81 to move rod 54 longitudinally in bearing 56, and will consequently move objective mounting 36 forwardly or rearwardly with reference to the finder body. Such rotation of shaft 80 is derived from swinging of the finder body on its pivot mounting pin 26, as now to be described.

Shaft 80 has formed thereon, directly above gear 81, a smaller gear 86. The latter gear is engaged by a gear segment 87, which is fastened, as by rivets 88, on an arm 89 pivoted coaxially with finder mounting pivot pin 26. The pivot axis of arm 89 is also the axis of gear segment 87, so that gear segment 87 is coaxial with the pivot of the finder mounting. Thus, as clearly shown in Fig. 7, arm 89 has a hub 90 which is taken within arcuate housing wall 67 and is rotatable on a stub shaft 92 which is mounted in housing 61 so as to be coaxial with pivot pin 26. For instance, shaft 92 may have reduced ends 93 received in bores 94 in the lower and upper walls 63 and 69 of the housing, and may be secured in place by means of flat headed screws 95 in the manner clearly shown in Fig. 7.

Arm 89 that carries gear segment 87 has a rearward extension 97 projecting rearwardly from housing 61 through aperture 96, and said extension has in its end an open ended slot 98 adapted to receive the shank of clamping screw 99 screwthreaded into the apex end of a substantially triangular plate 100 mounted, as by means of screws 101, on the upper edge of bracket 21 and extending outwardly substantially at right angles thereto. In operative position the finder body is swung until slot 98 engages the shank of screw 99, and screw 99 is then set up tightly. It will be evident that this operation locks arm extension 97, and consequently gear segment 87, rigid with brackets 21 and 18, and therefore sets gear segment 87 rigid with the camera.

Fig. 2 in full lines and Fig. 3 show the finder body locked by screw 99 in the operative position mentioned above, and show the finder body swung to a position where its longitudinally center line is approximately parallel to the optical axis O—O' of the camera. This is the position for long distance or infinity focus of the camera and finder objectives, and it will be observed that in this position the finder objective mounting 36 is in its extreme rearward position with reference to the finder. When the camera objective is then moved to focus on a close-up object, for instance, it becomes necessary to correct for parallax by swinging the view finder until its optical axis or center line intersects that of the camera at said object. Fig. 2 in dotted lines and Fig. 4 show the finder so swung to bring its field of view into coincidence with the close-up view on which the camera objective is now assumed to be focused. In so moving from the position of Fig. 3 to that of Fig. 4, gear 86 moves forwardly in an arc about the axis of finder pivot 26 as a center, and in so doing rolls on stationary gear 87, whose center is coaxial with pivot 26. Shaft 80 is accordingly caused to rotate, and acts through its gear 81 which meshes with the rack teeth on rod 54 to move said rod forwardly, with the result of moving objective mounting 36 forwardly to focus on the close-up object.

Without here giving a mathematical demonstration of the relation, it may be stated that in swinging the finder to correct for parallax it is necessary, in order to maintain the finder objective always focused at the distance of the intersection of the finder and camera optical axis, to move the finder objective longitudinally with reference to the finder body by an amount proportional to the tangent of the angle through which the finder is swung. It will be evident from a consideration of Figs. 3 and 4 that my mechanism is designed to maintain this tangent relation for all practical purposes. The movement of rod 54 and objective mounting 36 is proportional to the angle of rotation of gear 81 on shaft 80, and therefore, to the travel of gear 86 on gear 87, which is obviously proportional to the angle of swing of the finder about its pivot mounting. Within the limits of the comparatively small angle of swing made by the finder, the angle is nearly equal to its tangent, and the longitudinal focusing movement of the finder objective mounting is therefore substantially proportional to the tangent of the angle of finder swing. Whatever small differences there are between the angle of finder swing and its tangent are not sufficient to materially affect the focus of the finder objective.

The gear ratios of the focusing mechanism are properly chosen so that, starting for instance with a position wherein the line of the finder is swung inwardly to view a close-up object on which the camera is focused and wherein the finder objective is in a position such as to cast a sharp image on the finder ground glass surface 49, then as the finder is swung to move its center line outwardly the finder objective is moved rearwardly proportionally to the angle of swing of the finder and to a constant factor so related to the focal length of the finder objective that when the line of the finder becomes parallel to the optical axis of the camera the finder objective is in infinity focus position, with reference to the finder ground glass. The finder objective will then be in focus with reference to the ground glass for all intermediate positions.

The inoperative finder position shown in Fig. 8, with clamping screw 99 loosened and the finder swung away from the camera, is utilized when it is desired to swing down the camera door 14a, (on which focusing tube 17 is carried) to gain access to the camera interior.

It will be understood that the drawings and description are merely illustrative of and not restrictive on the broader claims appended hereto, for various changes in design, structure and arrangement may be made without departing from the spirit and scope of said claims.

I claim:

1. In combination with a camera having a photographic objective, a view finder comprising a finder body having a vertical pivot mounting on the camera to one side of the optical axis of the camera objective, an objective mounted for relative longitudinal focusing movement on the view finder body, a gear non-rotatably fixed with reference to the camera and having its axis concentric with the axis of the pivot mounting of the finder body, and gear means on the finder body meshing with said fixed gear and adapted to move with relation to and be driven by said fixed gear by virtue of swinging of the view finder on its pivot mounting, said gear means operatively connected with the finder objective to cause longitudinal focusing movement thereof on the finder body when said finder body is so swung on its pivot mounting.

2. In combination with a camera having a photographic objective, a view finder comprising a finder body having a vetrical pivot mounting on the camera to one side of the optical axis of the camera objective, an objective mounted for relative longitudinal focusing movement on the view finder body, a gear non-rotatably fixed with reference to the camera and having its axis concentric with the axis of the pivot mounting of the finder body, a rotatable gear on the finder body meshing with said fixed gear and adapted to move with relation to and be driven by said fixed gear by virtue of swinging of the view finder on its pivot mounting, and means adapted to be operated by said rotatable gear to cause longitudinal focusing movement of said finder obective when the finder body is so swung on its pivot mounting.

3. In combination with a camera having a photographic objective, a view finder comprising a finder body having a vertical pivot mounting on the camera to one side of the optical axis of the camera objective, an objective mounted for relative longitudinal focusing movement on the view finder body, a gear non-rotatably fixed with reference to the camera and having its axis concentric with the axis of the pivot mounting of the finder body, a rotatable gear on the finder body meshing with said fixed gear and adapted to move with relation to and be driven by said fixed gear by virtue of swinging of the view finder on its pivot mounting, and means adapted to be operated by said rotatable gear including a rack gear connected to the finder objective to cause longitudinal focusing movement of said finder objective when the finder body is so swung on its pivot mounting.

4. In combination with a camera having a photographic objective, a view finder comprising a finder body having a vertical pivot mounting on the camera to one side of the optical axis of the camera objective, a view finder objective mounting mounted for relative longitudinal focusing movement on the view finder body, a longitudinally extending rack gear mounted on said objective mounting, a gear non-rotatably fixed with reference to the camera and having its axis concentric with the axis of the pivot mounting of the finder body, and a rotatable gear on the finder body meshing with said fixed gear and adapted to move with relation to and be driven by said fixed gear by virtue of swinging of the view finder on its pivot mounting, said rotatable gear being geared to said rack gear, whereby swinging of the finder body on its pivot mounting causes co-related longitudinal focusing movement of the finder objective mounting.

5. In combination with a camera having a photographic objective, a view finder comprising a finder body having a vertical pivot mounting on the camera to one side of the optical axis of the camera objective, a view finder objective mounting mounted for relative longitudinal focusing movement on the view finder body, a longitudinally extending rack gear mounted on said objective mounting, a gear non-rotatably fixed with reference to the camera and having its axis concentric with the axis of the pivot mounting of the finder body, a vertical shaft rotatably mounted on the finder body, a gear on said shaft meshing with said fixed gear, and another gear on said shaft meshing with said rack gear, all in such manner that swinging of the finder body on its pivot mounting causes co-related longitudinal focusing movement of the finder objective mounting.

6. In combination with a camera having a photographic objective, a view finder comprising a finder body having a vertical pivot mounting on the camera to one side of the optical axis of the camera objective, an objective mounted for relative longitudinal focusing movement on the view finder body, a gear rotatably mounted on the view finder with its axis concentric with the axis of the pivot mounting of the finder body, means for fixing said gear against rotation with reference to the camera, a rotatable gear on the finder body meshing with said first mentioned gear, and means adapted to be operated by said last mentioned rotatable gear operatively connected with the finder objective to cause longitudinal focusing movement of said finder objective when the finder body is swung on its pivot mounting.

7. In combination with a camera having a photographic objective, a view finder comprising a finder body having a vertical pivot mounting on the camera to one side of the optical axis of the camera objective, an objective mounted for relative longitudinal focusing movement on the view finder body, a gear rotatably mounted on the view finder with its axis concentric with the axis of the pivot mounting of the finder body, a rigid arm on said gear adapted to be detachably connected with the camera to fix said gear against rotation with reference to the camera, a rotatable gear on the finder body meshing with said first mentioned gear, and means adapted to be operated by said last mentioned rotatable gear operatively connected with the finder objective to cause longitudinal focusing movement of said finder objective when the finder body is swung on its pivot mounting.

8. In combination with a camera having a photographic objective, a view finder comprising a finder body having a vertical pivot mounting on the camera to one side of the optical axis of the camera objective, an objective mounted for relative longitudinal focusing movement on the view finder body, gear means on the finder body operatively connected with the finder objective, and a gear non-rotatably fixed with reference to the camera meshing with said gear means and adapted to drive said gear means to cause longitudinal focusing movement of the finder objective on the finder body by virtue of swinging of the finder body on its pivot mounting with reference to the camera and said fixed non-rotatable gear.

GEORGE A. MITCHELL.